(12) United States Patent
Xu et al.

(10) Patent No.: US 11,386,593 B2
(45) Date of Patent: Jul. 12, 2022

(54) METHOD AND SYSTEM FOR AUTOMATICALLY SETTING SCAN RANGE

(71) Applicant: GE Precision Healthcare LLC, Wauwatosa, WI (US)

(72) Inventors: Yanran Xu, Beijing (CN); Fanbo Meng, Beijing (CN); Yu Huang, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 144 days.

(21) Appl. No.: 16/890,353

(22) Filed: Jun. 2, 2020

(65) Prior Publication Data

US 2020/0402272 A1  Dec. 24, 2020

(30) Foreign Application Priority Data

Jun. 18, 2019 (CN) .......................... 201910524760.5

(51) Int. Cl.
*G06T 7/55* (2017.01)
*G06T 7/50* (2017.01)
*G06T 11/00* (2006.01)
*G06T 7/00* (2017.01)

(52) U.S. Cl.
CPC .......... *G06T 11/006* (2013.01); *G06T 7/0012* (2013.01); *G06T 7/55* (2017.01); *G06T 2207/10024* (2013.01); *G06T 2207/10028* (2013.01); *G06T 2207/20081* (2013.01); *G06T 2210/41* (2013.01)

(58) Field of Classification Search
CPC ....... G06T 11/006; G06T 7/0012; G06T 7/55; G06T 2207/10024; G06T 2207/10028; G06T 2207/20081; G06T 2210/41; G06T 2207/20084; G06T 2207/30196; G06T 7/73; G06T 7/50; G06N 20/00; G06V 10/10

See application file for complete search history.

(56) References Cited

U.S. PATENT DOCUMENTS

| | | | | |
|---|---|---|---|---|
| 2015/0213646 A1* | 7/2015 | Ma | ............................ | G06T 7/50 345/420 |
| 2016/0306924 A1* | 10/2016 | Singh | ....................... | G06F 16/51 |
| 2018/0228460 A1* | 8/2018 | Singh | ........................ | G06T 7/12 |
| 2018/0330194 A1 | 11/2018 | Peng | | |
| 2018/0350081 A1* | 12/2018 | Hsieh | ................... | A61B 5/0064 |

FOREIGN PATENT DOCUMENTS

CN  106859675 A  6/2017

\* cited by examiner

*Primary Examiner* — Siamak Harandi (57) ABSTRACT

The present invention relates to a method and system for automatically setting a scan range. The method comprises: receiving an RGB image and a depth image of an object positioned on a scan table, respectively, by an RGB image prediction model and a depth image prediction model; generating an RGB prediction result based on the RGB image and a depth prediction result based on the depth image with respect to predetermined key points of the object, respectively, by the RGB image prediction model and the depth image prediction model; selecting a prediction result for setting the scan range from the RGB prediction result and the depth prediction result; and automatically setting the scan range based on the selected prediction result.

20 Claims, 8 Drawing Sheets

FIG. 1

Head First; Supine; No Coverings; Using Extender

FIG. 2A

Head First; Supine; with Coverings; Using Extender

METHOD AND SYSTEM FOR AUTOMATICALLY SETTING SCAN RANGE

CROSS-REFERENCE TO RELATED APPLICATIONS

This application claims the benefit of Chinese Patent Application No. 201910524760.5 filed Jun. 18, 2019, the disclosure of which is herein incorporated by reference in its entirety.

TECHNICAL FIELD

The present invention relates to the field of computer imaging, in particular to a method and system for automatically setting a scan range during a medical imaging process.

BACKGROUND

In a conventional medical imaging process such as computed tomography (CT), the scanning process is as follows: after an object (e.g., a patient) is positioned on the scanning bed, the operator moves the scanning bed into the bore of the gantry, manually sets the scan landmark utilizing laser alignment to determine the scan range, and finally begins scanning. Such scan preparation workflow is very complex and time-consuming. Moreover, the conventional preparation workflow for CT scan will inevitably result in errors and deviations as it is difficult to avoid human error. Even if the operator had not made any mistake, different operators may have a different understanding of the specific scan landmark, thereby resulting in errors and deviations in the scan preparation workflow. Therefore, simplifying the scan preparation workflow through automation has been one of the research hotspots in the field of medical equipment.

Automation of the scan preparation workflow can be accomplished with a computer prediction model. Normally, the RGB image and depth image of the object to be scanned may be acquired by a 3D camera, and then on the basis of the RGB image, and working with the depth image for positioning, the prediction model ultimately outputs only one prediction result. However, the reliability of the prediction result of the prediction model will be affected by differences in body shapes, postures, complex clinical settings of the object to be scanned, and the potential interferences of accessories, equipment, the operators and so on. The robustness of the scan range settings is thereby affected.

Therefore, a need in the art exists for an improved method and system for automatically setting a scan range with a simplified scan preparation workflow and improved reliability and robustness for scan range setting.

SUMMARY

According to one aspect of the present invention, a method for automatically setting a scan range is provided. This method may comprise: receiving an RGB image and a depth image of an object positioned on a scan table, respectively, by an RGB image prediction model and a depth image prediction model; generating an RGB prediction result based on the RGB image and a depth prediction result based on the depth image with respect to predetermined key points of the object, respectively, by the RGB image prediction model and the depth image prediction model; selecting a prediction result for setting the scan range from the RGB prediction result and the depth prediction result; and automatically setting the scan range based on the selected prediction result.

With the above noted method, the scan preparation workflow can be simplified through automatically setting the scan range utilizing the prediction results of two prediction models (i.e., the RGB image prediction model and the depth image prediction model), thereby reducing operator workload and ensuring that the scan preparation process can be completed more easily over a shorter period of time. Automatically setting the scan range can also reduce human errors and deviations, providing a more accurate final scan range and a better consistency between different scanning processes. In the above noted method, prediction results are produced with both the RGB image and the depth image, one of which is selected for automatic setting of the scan range. That is, the present invention is not solely dependent on one prediction result. Instead, automatically setting the scan range can be performed as long as either of the RGB image prediction model and the depth image prediction model can output a prediction result. As output prediction results are found in both the RGB image prediction model and the depth image prediction model, the above noted method entails selecting a more reliable prediction result from both predictions to automatically set the scan range. Therefore, the present invention is capable of providing improved reliability and robustness in spite of various challenges in key point prediction (e.g., complex clinical settings, different body shapes and postures of the object to be scanned, and the potential interferences from accessories, equipment, and operators).

In the embodiment, the RGB prediction result and the depth prediction result may be independent of one another.

In the embodiment, each of the RGB image prediction model and the depth image prediction model may be a deep-learning model.

In the embodiment, the method may further comprise: calculating an RGB confidence of the RGB prediction result and a depth confidence of the depth prediction result, respectively, wherein the step of selecting a prediction result for setting the scan range is based on a comparison of the RGB confidence and the depth confidence.

In the embodiment, the step of selecting a prediction result for setting the scan range may be based on a comparison of an RGB predetermined weight for the RGB prediction result and a depth predetermined weight for the depth prediction result.

In the embodiment, the step of selecting a prediction result for setting the scan range may further comprise: if the RGB confidence is less than a first threshold and the depth confidence is less than a second threshold, repeating the steps of receiving an RGB image and a depth image respectively, generating an RGB prediction result and a depth prediction result respectively, and calculating an RGB confidence level and a depth confidence level respectively, until at least one of the RGB confidence level and the depth confidence level is greater than or equal to a corresponding threshold.

In the embodiment, the step of selecting a prediction result for setting the scan range may further comprise: if the RGB confidence is greater than or equal to the first threshold or the depth confidence is greater than or equal to the second threshold, selecting the prediction result corresponding to the confidence greater than or equal to a corresponding threshold as the prediction result for setting the scan range.

In the embodiment, the step of selecting a prediction result for setting the scan range may further comprise: if the RGB confidence is greater than or equal to the first threshold and the depth confidence is greater than or equal to the second threshold, further comparing an RGB predetermined weight for the RGB prediction result and a depth predetermined weight for the depth prediction result, wherein if the RGB predetermined weight is not equal to the depth predetermined weight, the prediction result having a larger predetermined weight is selected as the prediction result for setting the scan range; and if the RGB predetermined weight is equal to the depth predetermined weight, the prediction result for setting the scan range is selected based on a result of the comparison of the RGB confidence and the depth confidence.

In one embodiment, the first threshold and the second threshold may be the same. In another embodiment, the first threshold and the second threshold may be different.

In the embodiment, the RGB prediction result is generated by identifying key points on the RGB image using the RGB image prediction model, and the depth prediction result is generated by identifying key points on the depth image using the depth image prediction model.

In the embodiment, the key points may comprise the head, chest, abdomen, pelvis, left knee joint, right knee joint, left ankle joint, and right ankle joint.

In the embodiment, the step of automatically setting the scan range based on the selected prediction result may comprise: mapping 2D locations of the key points in the selected prediction result into 3D space using a transfer matrix to generate a scan landmark of the object.

In the embodiment, displaying the RGB image and the scan range, and optionally displaying the depth image, the RGB prediction result, the depth prediction result, the RGB confidence, the depth confidence, and/or the selected prediction result, to an operator via a display.

In the embodiment, the method is performed in real time once an operator creates a new scan task, until the operator confirms the scan range, wherein the performed in real time comprises performing the method each time a change in body position of the object is sensed.

Therefore, before determining a final scan range, the present invention may re-export the prediction result in a timely manner for selection and further scan range setting in response to the body position adjustment of the object to be scanned.

According to another aspect of the present invention, a system for automatically setting a scan range is provided. The system may comprise: image receiving means for receiving an RGB image and a depth image of an object positioned on a scan table, respectively, by an RGB image prediction model and a depth image prediction model; prediction result generating means for generating an RGB prediction result based on the RGB image and a depth prediction result based on the depth image with respect to predetermined key points of the object, respectively, by the RGB image prediction model and the depth image prediction model; prediction result selecting means for selecting a prediction result for setting the scan range from the RGB prediction result and the depth prediction result; and scan range setting means for automatically setting the scan range based on the selected prediction result.

In the embodiment, the RGB prediction result and the depth prediction result may be independent of one another.

In the embodiment, each of the RGB image prediction model and the depth image prediction model may be a deep-learning model.

In the embodiment, the system may further comprise: confidence calculating means for calculating an RGB confidence of the RGB prediction result and a depth confidence level of the depth prediction result, respectively. The prediction result selecting means may further comprise: confidence comparing means for a comparison of the RGB confidence and the depth confidence.

In the embodiment, the prediction result selecting means may further comprise: weight comparing means for comparing the RGB predetermined weight for the RGB prediction result and a depth predetermined weight for the depth prediction result.

In the embodiment, the prediction result selecting means may further comprise: confidence-threshold comparing means for comparing between the RGB confidence and a first threshold and between the depth confidence and a second threshold, wherein the prediction result selecting means is used for: if the RGB confidence is less than the first threshold and the depth confidence is less than the second threshold, repeatedly causing the image receiving means to receive an RGB image and a depth image respectively, causing the prediction result generating means to generate an RGB prediction result and a depth prediction result respectively, and causing the confidence calculating means to calculate an RGB confidence level and a depth confidence respectively, until at least one of the RGB confidence level and the depth confidence level is greater than or equal to a corresponding threshold.

In the embodiment, the prediction result selecting means is for: if the RGB confidence is greater than or equal to the first threshold or the depth confidence is greater than or equal to the second threshold, selecting the prediction result corresponding to the confidence greater than or equal to a corresponding threshold as the prediction result for setting the scan range.

In the embodiment, the prediction result selecting means may further comprise: weight comparing means for further comparing an RGB predetermined weight for the RGB prediction result and a depth predetermined weight for the depth prediction result if the RGB confidence is greater than or equal to the first threshold and the depth confidence is greater than or equal to the second threshold. The prediction result selecting means is for: if the RGB predetermined weight is not equal to the depth predetermined weight, the prediction result having a larger predetermined weight may be selected as the prediction result for setting the scan range; and if the RGB predetermined weight is equal to the depth predetermined weight, the prediction result for setting the scan range may be selected based on a result of the comparison of the confidence comparing means.

In one embodiment, the first threshold and the second threshold may be the same. In another embodiment, the first threshold and the second threshold may be different.

In the embodiment, prediction result generating means is for: generating the RGB prediction result through identifying key points on the RGB image utilizing the RGB image prediction model, and generating the depth prediction result through identifying key points on the depth image utilizing the depth image prediction model.

In the embodiment, the key points may comprise: the head, chest, abdomen, pelvis, left knee joint, right knee joint, left ankle joint, and right ankle joint.

In the embodiment, the scan range setting means is used for: mapping 2D locations of the key points in the selected prediction result into 3D space using a transfer matrix, so as to generate a scan landmark of the object.

In the embodiment, the system may further comprise a display for displaying the RGB image and the scan range, and optionally for displaying the depth image, the RGB prediction result, the depth prediction result, the RGB confidence, the depth confidence, and/or the selected prediction result, to an operator.

In the embodiment, once an operator creates a new scan task, the system may be operated in real time until the operator confirms the scan range. The aforementioned operating in real time may comprise operating the system each time a change in body position of the object is sensed.

According to yet another aspect of the present invention, a computer readable medium is provided. The computer readable medium has instructions thereon, and when the instructions are executed by a processor, the above noted methods and steps are executed by the processor.

According to yet another aspect of the present invention, a medical imaging device is provided, the medical imaging device comprising the above noted system.

These and other features and aspects of the present invention will become clearer through the detailed description with reference to the drawings hereinbelow.

BRIEF DESCRIPTION OF THE DRAWINGS

To obtain a greater understanding of the present invention in detail, please refer to the embodiments for a more detailed description of the present invention as briefly summarized above. Some embodiments are illustrated in the drawings. In order to facilitate a better understanding, the same symbols have been used as much as possible in the figures to mark the same elements that are common in the various figures. It should be noted, however, that the drawings only illustrate the typical embodiments of the present invention and should therefore not be construed as limiting the scope of the present invention as the present invention may allow other equivalent embodiments. In the figures.

It can be expected that the elements in one embodiment of the present invention may be advantageously applied to the other embodiments without further elaboration.

DETAILED DESCRIPTION

Specific implementation manners of the present invention will be described in the following. It should be noted that during the specific description of the implementation manners, it is impossible to describe all features of the actual implementation manners in detail in this description for the sake of brief description. It should be understood that in the actual implementation of any of the implementation manners, as in the process of any engineering project or design project, a variety of specific decisions are often made in order to achieve the developer's specific objectives and meet system-related or business-related restrictions, which will vary from one implementation manner to another. Moreover, it can also be understood that although the efforts made in such development process may be complex and lengthy, for those of ordinary skill in the art related to content disclosed in the present invention, some changes in design, manufacturing, production or the like based on the technical content disclosed in the present invention are only conventional technical means. The content of the present invention should not be construed as insufficient.

Unless otherwise defined, the technical or scientific terms used in the claims and the description are as they are usually understood by those of ordinary skill in the art to which the present invention pertains. The words "first," "second" and similar words used in the description and claims of the patent application of the present invention do not denote any order, quantity or importance, but are merely intended to distinguish between different constituents. "One," "a" and similar words are not meant to be limiting, but rather denote the presence of at least one. The word "include," "comprise" or a similar word is intended to mean that an element or article that appears before "include" or "comprise" encompasses an element or article and equivalent elements that are listed after "include" or "comprise," and does not exclude other elements or articles. The word "connect," "connected" or a similar word is not limited to a physical or mechanical connection, and is not limited to a direct or indirect connection.

In an embodiment of the present invention, a scan range for an object to be scanned can be automatically set. The object to be scanned may be, for example, a human patient, an animal, an article (such as a part), or a variety of foreign objects (such as dental implants, scaffolds, contrast agents) which are present within the body, and the like. While the present invention is described with reference to CT devices, it should further be understood that the present invention may also be used in other suitable types of medical imaging devices, such as magnetic resonance imaging (MRI) devices, C-Arm imaging devices, positron emitting tomography (PET) devices, single-photon emission computed tomography (SPECT) devices and so on. It should also be understood that the present invention may also be applicable to other suitable imaging devices other than medical imaging devices.

Figure 1:
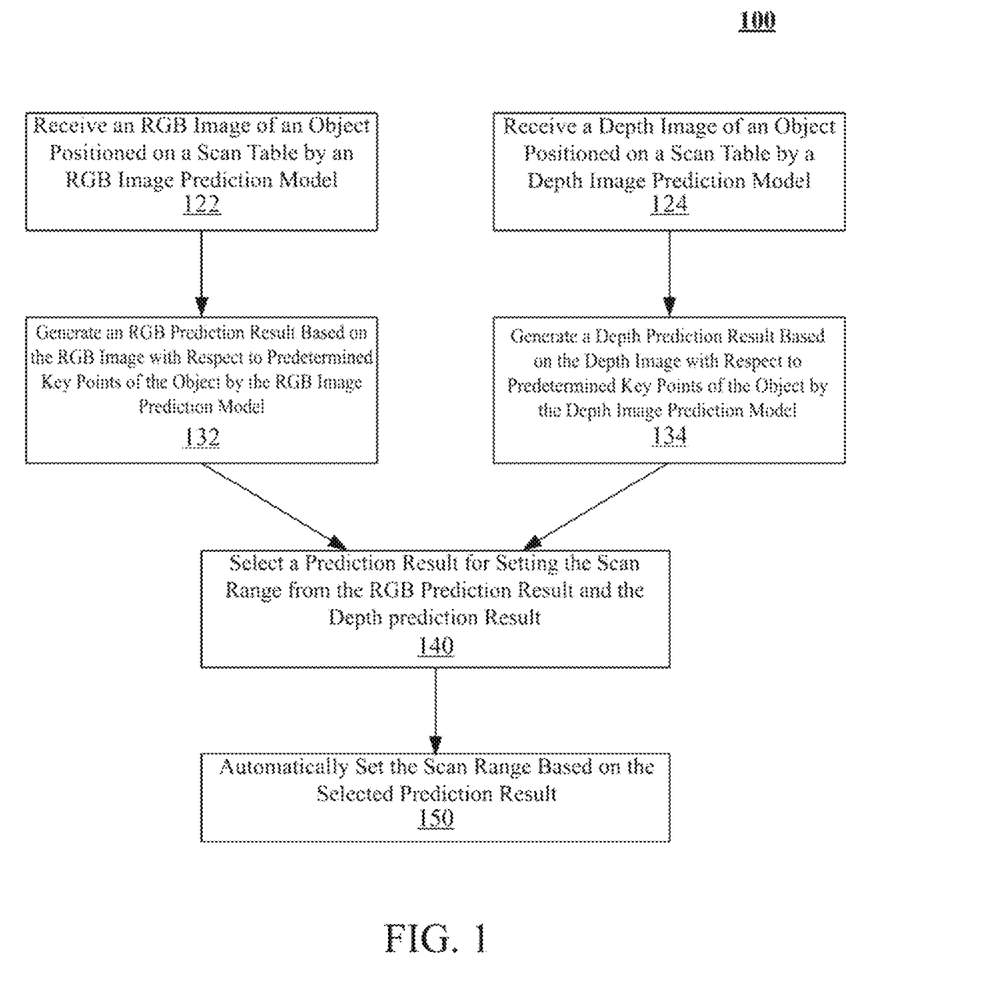
FIG. 1 illustrates a flowchart of method 100 for automatically setting a scan range according an embodiment of the present invention.

FIG. 1 illustrates a flowchart of method 100 for automatically setting a scan range according the embodiment of the present invention. Method 100 is a dual-branch method, comprising an RGB branch and a depth branch. In a preferable embodiment of the present invention, method 100 may be a method based on depth learning. In one embodiment, method 100 may comprise the following steps of:

Steps 122 and 124: receiving an RGB image and a depth image of an object positioned on a scan table, respectively, by an RGB image prediction model and a depth image prediction model;

Steps 132 and 134: generating an RGB prediction result based on the RGB image and a depth prediction result based on the depth image with respect to predetermined key points of the object, respectively, by the RGB image prediction model and the depth image prediction model;

Step 140: selecting a prediction result for setting the scan range from the RGB prediction result and the depth prediction result; and Step 150: automatically setting the scan range based on the selected prediction result.

In method 100, Steps 122 and 132 belong to the RGB branch; Steps 124 and 134 belong to the depth branch. The two branches may be independent of each other.

In one embodiment of the present invention, an image acquisition device (e.g., a 3D camera) may be utilized to acquire an RGB-D image of the object to be scanned, and the RGB-D image comprises an RGB image and a depth image. The value of each pixel of an RGB image corresponds to the RGB information of such pixel (i.e., red, green, blue), and the value of each pixel of the depth image corresponds to the depth information of such pixel (i.e., the distance of the pixel from the camera). The 3D camera may be a structured light camera, a stereoscopic camera, or time-of-flight camera, which is herein collectively referred to as an RGB-D camera, such as the Intel RealSense series. In one embodiment, the RGB-D camera may be mounted on a scanning bed. In other embodiments, the RGB-D camera may also be mounted at any other suitable location on the ray tube or imaging system.

After the object to be scanned is positioned on the scanning bed, the RGB-D camera may begin to acquire an RGB image and a depth image of the object. Alternatively, a trigger condition for beginning the image acquisition may also be set. For example, a button that begins to acquire the RGB image and depth image of the object to be scanned when the operator presses such button may be set. For another example, image acquisition may begin as a linked action when the operator creates a new scan task. The acquired RGB image and depth image are input into the RGB image prediction model and the depth image prediction model, respectively. The RGB image prediction model and the depth image prediction model may operate independently of each other. The RGB image prediction model is used to analyze the RGB image to be scanned, while the depth image prediction model is used to analyze the depth image of the object to be scanned. The RGB image prediction model and the depth image prediction model may be any suitable models based on machine learning, such as a depth learning model (e.g., a convolution model), linear model, decision tree model, random forest model, models based on clusters, or probabilistic graphical models (e.g., Bayesian classification model) and so on.

Figure 7:
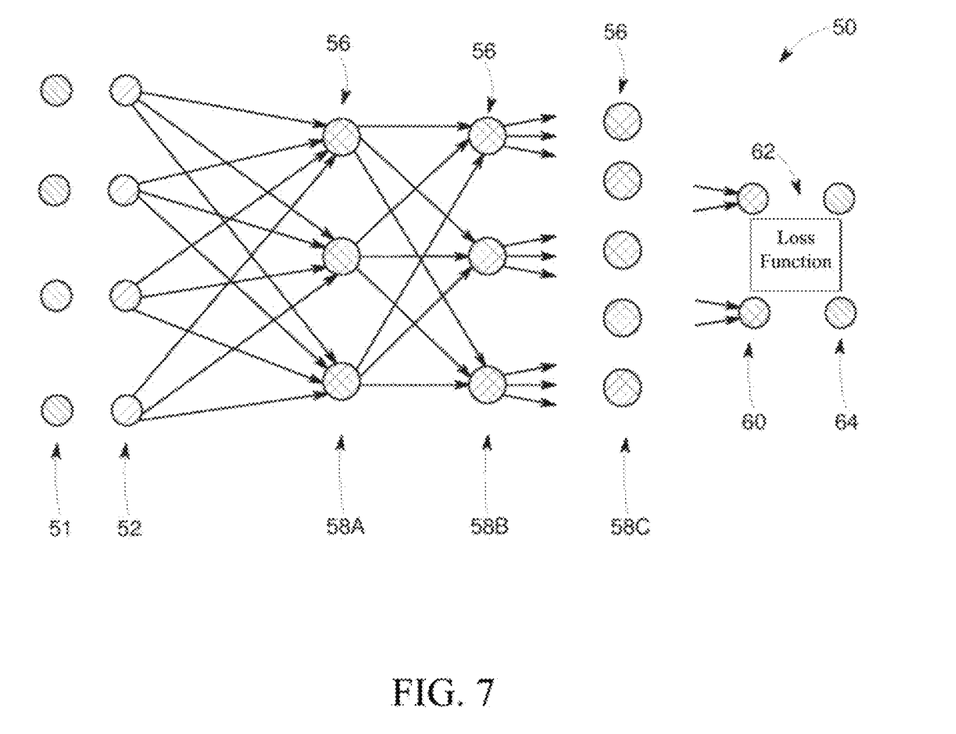
FIG. 7 illustrates an example depth learning model that may be used in an embodiment of the present invention.

In a preferable embodiment, the RGB image prediction model and the depth image prediction model may be two trained depth learning models. FIG. 7 schematically depicts an example artificial neural network 50 that can be trained as a depth learning model that may be used in the embodiment of the present invention. As illustrated in FIG. 7, the artificial neural network 50 is a multi-layer model, including, for example, an input layer 52 that can be used to receive or acquire input data 51, a plurality of hidden layers such as 58A, 58B, and 58C and so on, as well as an output layer 60. In addition, the model 50 may also include training target data 64 used during the training process. In the embodiment as illustrated in FIG. 7, each layer consists of a plurality of neurons 56. The number of neurons 56 may be the same between different layers, or may be different as illustrated in FIG. 7. Neurons 56 in each layer produce a corresponding output that functions as an input to neurons 56 in the next layer of model 50. In practice, a weighted sum of inputs with additional deviations may be calculated to activate each of the corresponding neurons 56 in the layer of model 50 according to an activation function (such as an S-shaped activation function, rectified linear unit (ReLU) and so on). During the training process, the output from output layer 60 of model 50 (i.e., the prediction result of model 50) is compared with the training target data 64, and a loss or error function 62 is calculated, and the error function 62 may conversely be used to guide further training of model 50 (using SGD or other methods). In some embodiments, loss function 62 may be a mean square error (MSE) and/or may take into account the differences of features in the other images/data. Alternatively, the loss function 62 may be defined by other metrics associated with a particular task. While FIG. 7 has illustrated a simple and fully connected example model 50 with a clear layer-by-layer architecture, other architectures may also be selected for a single layer, multiple layers, or the entire model. For example, one or more layers in the model may be represented by a convolution neural network (CNN). Similarly, some parts of the model may be configured using a hybrid architecture that is not configured in accordance with a strict layer-by-layer processing architecture. For example, some connections may skip one or more layers (i.e., connecting nodes in a non-continuous layer directly); alternatively, a network architecture that does not correspond to a clear layer-by-layer architecture may be selected.

Now please refer to FIG. 1 which describes the RGB branch of method 100. First, in Step 122, the RGB image prediction model may receive an RGB image of the acquired object to be scanned. After the RGB image prediction model receives the RGB image of the object, the image may optionally be pre-processed. The pre-processing may include, but not limited to, changing the size of the image, smoothing the image, cutting the image, denoising the image and so on.

Next, in Step 132, the RGB image prediction model may generate an RGB image-based RGB prediction result with respect to predetermined key points of the object. In one embodiment, an RGB image prediction model is utilized to identify predetermined key points on an RGB image of the object to thereby generate an RGB prediction result with respect to key points of the object. The definition of a key point may depend on the clinical requirements. In the embodiment, a key point may be defined as commonly used important feature points, such as joints, the face, and so on. For living organisms, different key points correspond to different anatomical structure protocols. In the embodiment, the particular location of a key point may be specified at a position corresponding to a mark aimed at when carrying out a conventional laser scan for that particular site. The number of key points can be any suitable number depending on the clinical requirements. In the illustrative embodiment of a human patient as shown in FIGS. 2A-2D, there are eight key points 8, which are shown as dots P1-P8 in FIGS. 2A-2D. The eight key points are respectively the head, chest, abdomen, pelvis, left knee joint, right knee joint, left ankle joint, and right ankle joint. In other embodiments, there may be different numbers of key points, such as 18, or the key points may also be located elsewhere.

Figure 2A:
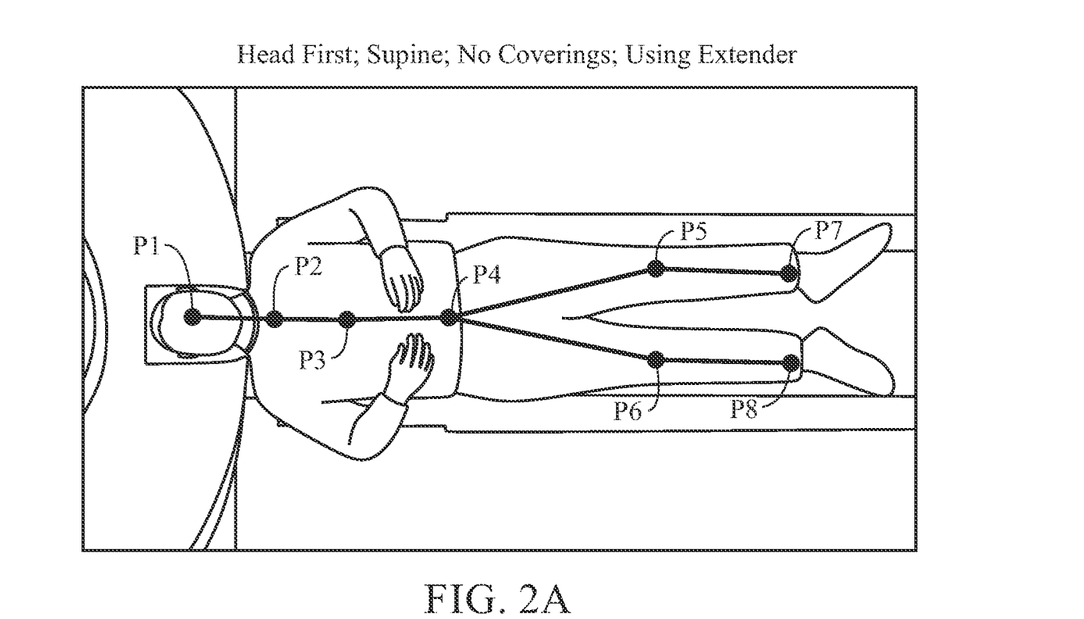
FIGS. 2A-2D illustrate eight example key points on a human body according to an embodiment of the present invention.
Figure 2B:
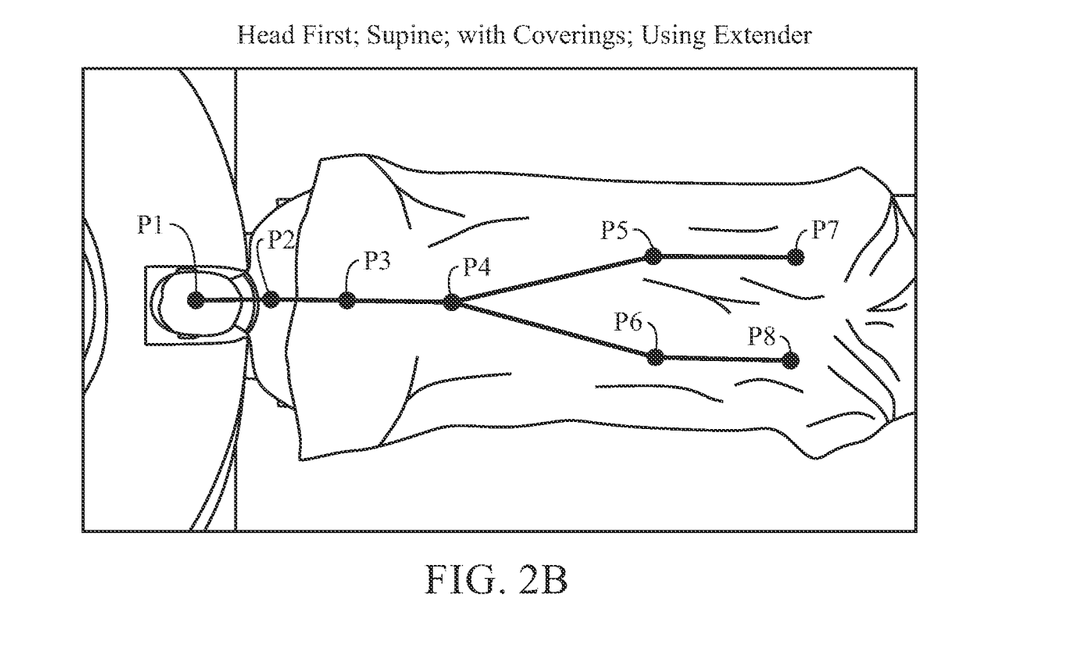
Figure 2C:
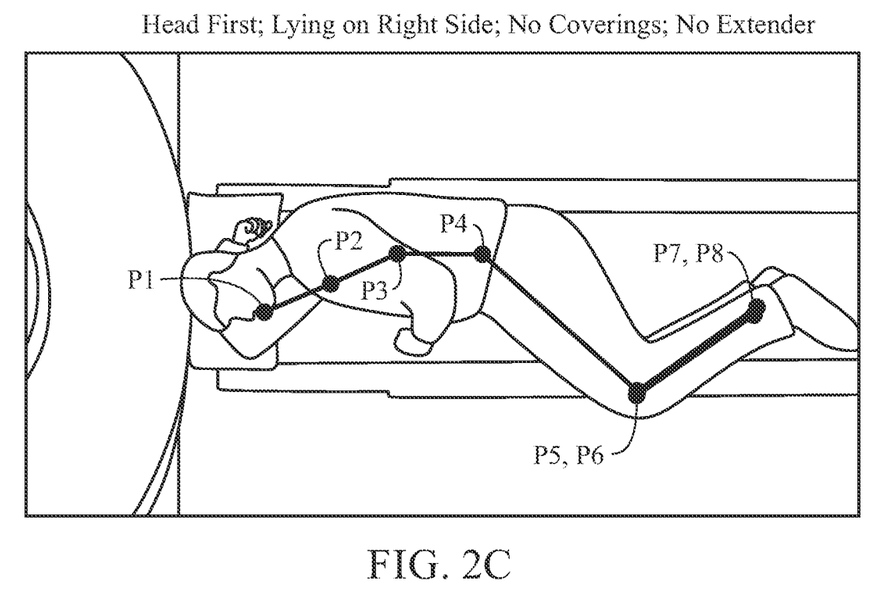
Figure 2D:
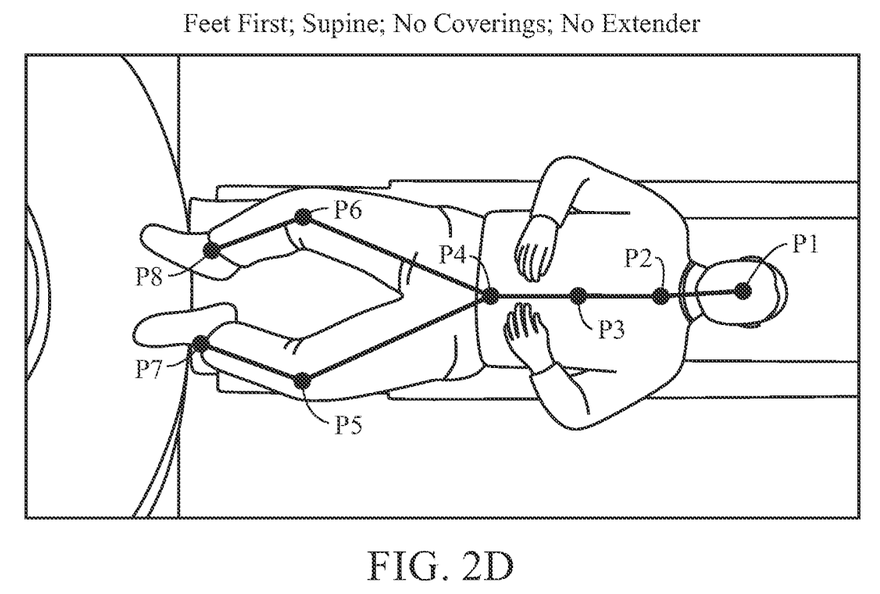

In Step 132, detecting, positioning, and thereby identifying key points of the object to be scanned requires the consideration of a number of additional factors, such as the scanning environmental conditions, postures of the object to be scanned, and the like. In one embodiment, factors to be considered are as follows: whether the head enters the bore of the gantry first or the feet enter into the bore of the gantry first; whether the object is in supine position, prone posture, or lying on the left side or on the right side; whether there is any covering, such as a blanket, a hospital gown, and so on; and whether any extender is used, such as a head support and so on. FIG. 2A schematically illustrates the above noted eight example key points, P1-P8, under the conditions of the head first, the object being in supine posture, no coverings, and using a head support. FIG. 2B schematically illustrates the above noted eight example key points, P1-P8, under the conditions of the head first, the object being in supine posture, having coverings, and using a head support. FIG. 2C schematically illustrates the above noted eight example key points, P1-P8, under the conditions of the head first, lying on the right side, no coverings, and not using an extender. FIG. 2D schematically illustrates the above noted eight example key points, P1-P8, under the conditions of the feet first, supine, no coverings, and not using an extender.

The identification of the key points and the generation of the RGB prediction result thereby may be based on, for example, a heat map. The generated RGB prediction result may include, but not limited to, 2D locations of identified key points, and postures of the object to be scanned.

The depth branch of method 100 is similar to the RGB branch. As illustrated in FIG. 1, first, in Step 124, the depth image prediction model may receive a depth image of the acquired object to be scanned. After the depth image prediction model receives the depth image of the object, the image may optionally be pre-processed. The pre-processing may include, but not limited to, changing the size of the image, smoothing the image, cutting the image, denoising the image and so on.

Next, in Step 134, the depth image prediction model may generate a depth image-based depth prediction result with respect to predetermined key points of the object. In one embodiment, a depth image prediction model is utilized to identify predetermined key points on a depth image of the object to generate a depth prediction result with respect to key points of the object. It should be noted that the key points identified in the depth branch are the same as the key points as identified in the RGB branch.

In addition, in Step 134, detecting, positioning, and thereby identifying key points of the object to be scanned requires the consideration of a number of additional factors that are the same as in Step 132 of the RGB branch, such as scanning environmental conditions, postures of the object to be scanned, and the like.

The identification of the key points and the generation of the depth prediction result thereby may be based on, for example, a heat map. The generated depth prediction result may include, but not limited to, 2D locations of identified key points and postures of the object to be scanned.

Thus, with respect to the same key points of the same object, the RGB branch of method 100 outputs an RGB prediction result and the depth branch outputs a depth prediction result. The RGB branch and depth branch may be independent of each other, and correspondingly, the generated RGB prediction result and depth prediction result may also be independent of each other.

Please continue to refer to FIG. 1. Next, in Step 140, a prediction result is selected for setting the scan range from the RGB prediction result and the depth prediction result.

Such a selection may be accomplished in various suitable ways. In the embodiment, the prediction result may be selected for setting the scan range according to the comparison with respect to one or more factors between the RGB prediction result and depth prediction result. Examples of such factors are as follows: confidence level, predetermined weight, the maximum peak of the heat map, the weighted average of all peaks of the heat map, the dispersion degree of peaks of the heat map and so on. Through such comparison, the prediction result that is more reliable in the prediction results output by the two branches can be identified. An example comparison process is described in detail below with reference to FIGS. 3-5.

Figure 3:
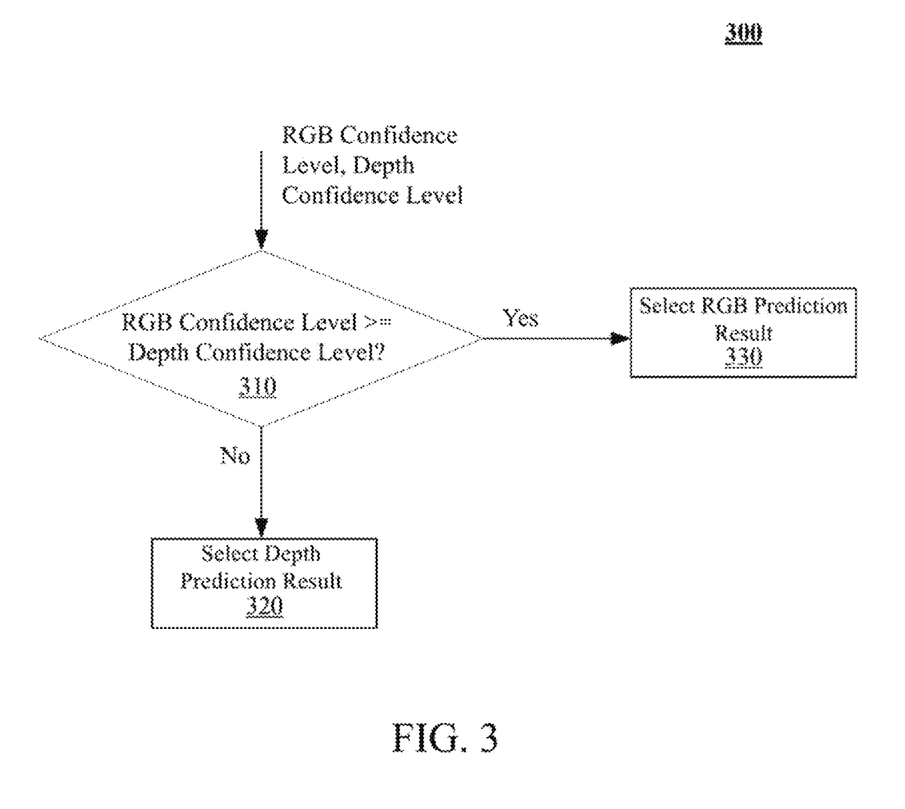
FIG. 3 illustrates an example method of selecting a prediction result for setting a scan range according to an embodiment of the present invention.

FIG. 3 illustrates an example method 300 of selecting a prediction result for setting a scan range according to the embodiment of the present invention. With method 300, a prediction result is selected for setting the scan range from the confidence level comparison result of the RGB prediction result and the depth prediction result. Confidence level of the RGB prediction result (hereinafter referred to as the "RGB confidence level") and the confidence level of the depth prediction result (hereinafter referred to as the "depth confidence level") may be calculated separately, for example, automatically calculated by the RGB image prediction model and the depth image prediction model, respectively. In the implementation of the present invention, factors such as different clinical settings and different lighting conditions may affect the accuracy of the prediction result of the prediction model, thereby affecting the calculated RGB confidence level and depth confidence level.

The term "confidence level" used herein refers to the probability for the various key points generated by the prediction model in the prediction result to be situated in the coordinate positions as indicated by the prediction result. Herein, the level of confidence is expressed in a range of 0 to 1.0, but any other suitable means may also be used to represent the level of confidence, such as a percentage.

As illustrated in FIG. 3, in method 300, the RGB confidence level and the depth confidence level may be compared in Step 310. In one embodiment, if the RGB confidence level is less than the depth confidence level (the comparison result in Step 310 is "no"), then the depth prediction result may be selected as the prediction result for setting the scan range, as illustrated in block 320. On the contrary, if the RGB confidence level is greater than or equal to the depth confidence level (the comparison result in Step 310 is "yes"), then the RGB prediction result may be selected as the predicted result for setting the scan range, as illustrated in block 330.

Figure 4:
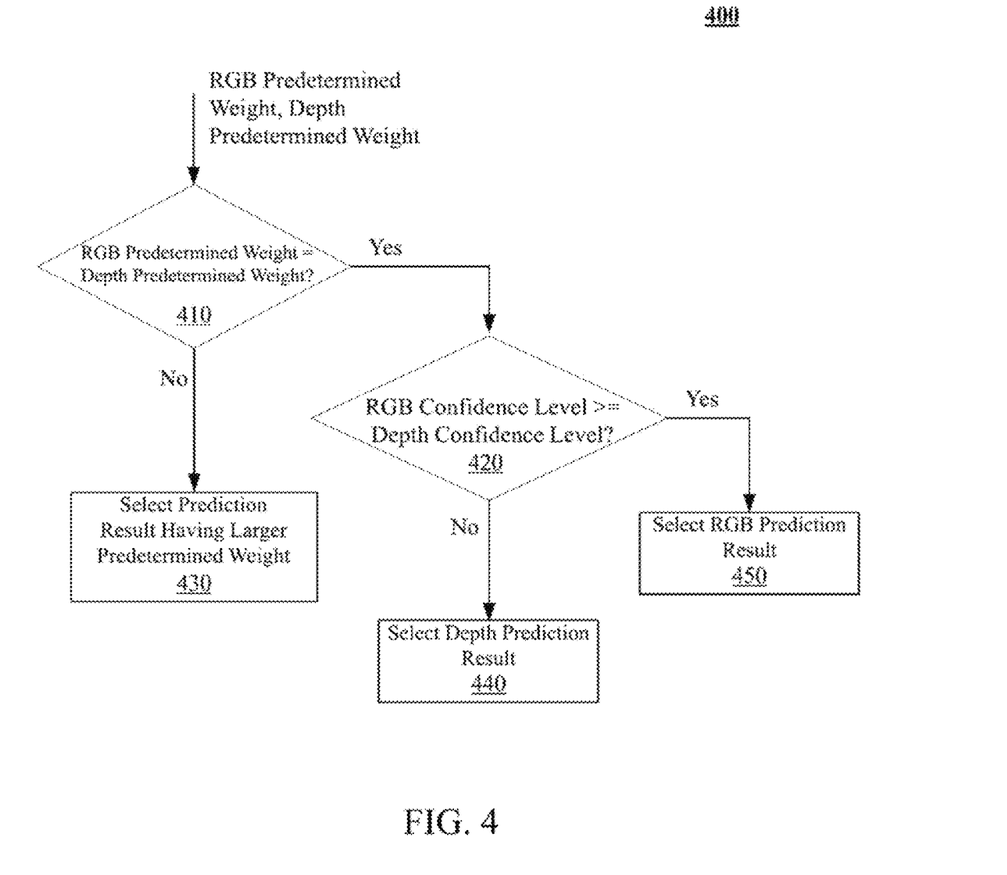
FIG. 4 illustrates another example method of selecting a prediction result for setting a scan range according to an embodiment of the present invention.

FIG. 4 illustrates another example method 400 of selecting a prediction result for setting a scan range according to the embodiment of the present invention. Method 400 further enhances the reliability and robustness of the present invention by further introducing a comparison of a predetermined weight of the RGB prediction result (hereinafter referred to as the "RGB predetermined weight") and a predetermined weight of the depth prediction result (hereinafter referred to as the "depth predetermined weight").

Herein, a "predetermined weight" is preset by clinicians based on their clinical practices and clinical experiences for different scan sites. In general, if the site to be scanned contains a lot of detailed information (such as a head scan), then a greater weight tends to be imparted to the RGB prediction result. If the detailed information for the site to be scanned is not as important, and if the profile trend is more important (such as a chest scan and abdominal scan), a greater weight tends to be imparted to the depth prediction result. In other cases, an equal weight may be imported to the RGB prediction result and depth prediction result.

In the embodiment as illustrated in FIG. 4, the RGB predetermined weight and depth predetermined weight may be compared in Step 410. In one embodiment, if the RGB predetermined weight is not equal to the depth predetermined weight (the comparison result in Step 410 is "no"), then the prediction result having a larger predetermined weight may be selected as the prediction result for setting the scan range, as illustrated in block 430. On the contrary, if the RGB predetermined weight is equal to the depth predetermined weight (the comparison result in Step 410 is "yes"), then the RGB confidence level and depth confidence level may be further compared in Step 420. Similar to FIG. 3, if the RGB confidence level is less than the depth confidence level (the comparison result in Step 420 is "no"), then the depth prediction result may be selected as the prediction result for setting the scan range, as illustrated in block 440. On the contrary, if the RGB confidence level is greater than or equal to the depth confidence level (the comparison result in Step 420 is "yes"), then the RGB prediction result may be selected as the predicted result for setting the scan range, as illustrated in block 450.

In other embodiments of the present invention, the RGB confidence level and depth confidence level may also be compared first, and then the RGB predetermined weight and depth predetermined weight are further compared.

Figure 5:
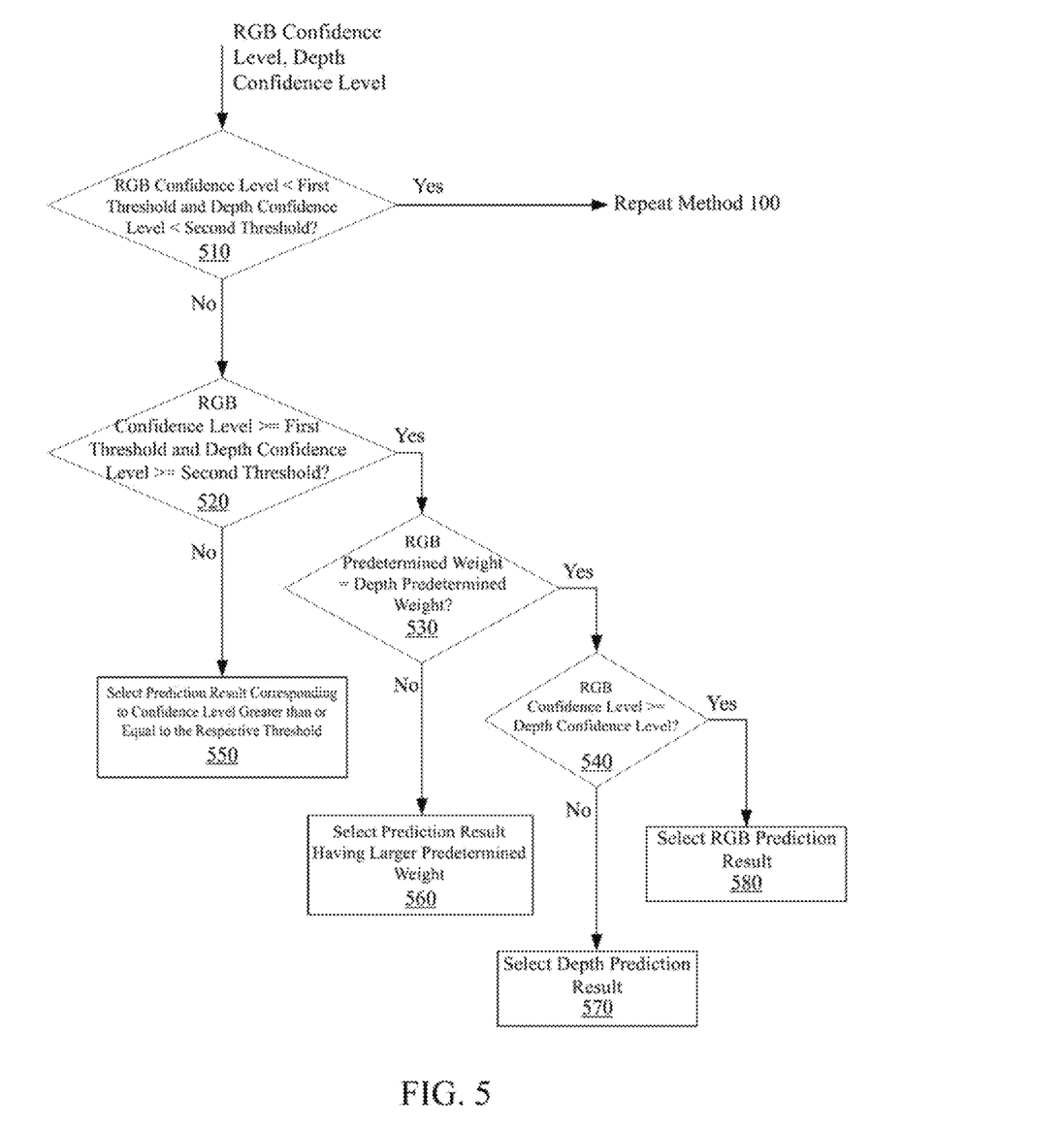
FIG. 5 illustrates yet another example method of selecting a prediction result for setting a scan range according to an embodiment of the present invention.

Now please refer to FIG. 5. FIG. 5 illustrates yet another example method 500 of selecting a prediction result for setting a scan range according to the embodiment of the present invention. In method 500, thresholds for the RGB confidence level and depth confidence level are further introduced so that the reliability and robustness of the present invention can be further improved.

In the embodiment of the present invention, thresholds for confidence levels may be preset based on clinical practices and clinical experiences. When the confidence level of the prediction result is less than a set threshold, it may be considered that the prediction result is not credible. When the confidence level of the prediction result is greater than a set threshold, it may be considered that the prediction result is credible. It should be noted that, the thresholds for confidence levels may be set differently for different objects to be scanned and/or different sites to be scanned. For example, for a head scan of a human patient, a threshold for a confidence level of 0.8 may be set. That is, the prediction result is only considered credible when the confidence level is greater than or equal to 0.8. For another example, a confidence level threshold of 0.6 may be set for a chest scan of a human patient. That is, of the prediction result may be considered credible when the confidence level is greater than or equal to 0.6.

In a preferable embodiment as illustrated in FIG. 5, it may be determined, in Step 510, as to whether the RGB confidence level is less than the first threshold and the depth confidence level is less than the second threshold. In one embodiment, the first and second thresholds may be set to the same value, such as 0.5 or 0.8. In another embodiment, the first and second thresholds may be set to different values. For example, the first threshold is set to 0.8, and the second threshold is set to 0.5 and so on.

As illustrated in FIG. 5, when the RGB confidence level is less than the first threshold and the depth confidence level is less than the second threshold (i.e., the determined result in Step 510 is "yes"), neither the RGB prediction result nor the depth prediction result is credible. In this case, it may be considered that method 100 has provided no prediction result to be selected, and thus, a new RGB image and a new depth image of the object to be scanned will need to be acquired, and the RGB branch and depth branch of method 100 will need to be re-implemented. In one embodiment, a notification may be sent to the operator via a user interface (UI) on the display that neither of the prediction results of the two branches is credible. In the embodiments, the operator may instruct the object to be scanned to adjust their postures or adjust the working parameters through the UI, so as to acquire a new RGB image and depth image to generate the new RGB prediction result and depth prediction result, and calculate the new RGB confidence level and depth confidence level for comparison and selection.

When the determined result in Step 510 is "no" (i.e., at least one of the RGB confidence level and depth predicts is greater than or equal to the threshold), meaning at least one of the RGB prediction result and the depth prediction result is credible, then it may be further determined in Step 520 as to whether the RGB confidence level is greater than equal to the first threshold and the depth confidence level is greater than or equal to the second threshold, i.e., determining whether only one of the RGB confidence level and depth confidence level is greater than or equal to the threshold.

If the RGB confidence level is greater than or equal to the first threshold or the depth confidence level is greater than or equal to the second threshold (the determined result in Step 520 is "no"), i.e., only one of the RGB confidence level and depth confidence level is greater than or equal to the threshold, then the predicted result corresponding to the confidence level that is greater than or equal to the threshold may be selected as the prediction result for setting the scan range, as illustrated in block 550.

If both the RGB confidence level and the depth confidence level are greater than or equal to the threshold (the determined result in Step 520 is "yes"), then the RGB predetermined weight and depth predetermined weight may be further compared in Step 530. In one embodiment as illustrated in FIG. 5, if the RGB predetermined weight is not equal to the depth predetermined weight (the comparison result in Step 530 is "no"), then the prediction result having a larger predetermined weight may be selected as the prediction result for setting the scan range, as illustrated in block 560. On the contrary, if the RGB predetermined weight is equal to the depth predetermined weight (the comparison result in Step 530 is "yes"), then the RGB confidence level and depth confidence level may be further compared in Step 540. As illustrated in FIG. 5, if the RGB confidence level is less than the depth confidence level (the comparison result in Step 540 is "no"), then the depth prediction result may be selected as the prediction result for setting the scan range, as illustrated in block 570. On the contrary, if the RGB confidence level is greater than or equal to the depth confidence level (the comparison result in Step 540 is "yes"), then the RGB prediction result may be selected as the predicted result for setting the scan range, as illustrated in block 580.

Taking a head scan as an example, the first threshold for the RGB confidence level and the second threshold for the depth confidence level may be both set to 0.8. When the RGB confidence level and depth confidence level are both greater than or equal to 0.8, when it comes to a head scan, the RGB prediction result has a greater predetermined weight than the depth prediction result. Consequently, the RGB prediction result should be selected even if the depth confidence level is higher than the RGB confidence level. However, if the depth confidence level alone is greater than or equal to 0.8, then the depth prediction result should be selected. In addition, if the RGB confidence level and depth confidence level are both less than 0.8, then no prediction result is selected.

Methods 300, 400, and 500 are merely illustrative without limitation. The present invention may also adopt any other suitable factors to achieve the selection of the prediction result between the two branches.

Now refer back to FIG. 1. In Step 150, the scan range is automatically set based on the selected prediction result in Step 140.

In one embodiment, the automatically setting a scan range for the object to be scanned may be achieved through generating a scan landmark of the object to be scanned by mapping 2D locations of the key points in the selected prediction result into 3D space using a transfer matrix. In particular, for a predetermined site to be scanned, the depth information of the RGB-D image may be used to transform the 2D locations of the key points corresponding to the site into 3D space coordinates (i.e., the scan landmarks) in a camera coordinate system through the transfer matrix. In the embodiment, the parameters and matrices required for the coordinate transformation may be obtained through the camera and its calibration process. Additionally, for this predetermined site to be scanned, a scan protocol library can be searched to match the scan protocol, and then a preset start point and end point of the scan are read from the selected scan protocol. The scan range for the site to be scanned can be calculated based on the scan landmark and the start and end points of the scan. For example, when the scan landmark is defined as the 0 point of the scan range, and if the start and end points that are read for the scan are respectively −10 mm and 20 mm, then the resulting scan range may be from a position 10 mm floating forward from the scan landmark to a position 20 mm floating backwards from the scan landmark in the moving direction of the scanning bed (in the case that the head enters into the bore of gantry first), or may be from a position 20 mm floating forward from the scan landmark to a position 10 mm floating backwards from the scan landmark in the moving direction of the scanning bed (in the case that the feet enter into the bore of the gantry first). In other embodiments, the scan range may also be calculated with reference to the other orientations.

In addition, in the embodiment of the present invention, the RGB image of the object to be scanned and the corresponding scan range automatically set may be shown to the operator via a display. In further embodiments, in addition to the RGB image and the scan range, the display may also display one or more of the depth images of the object to be scanned, the resulting RGB prediction result, depth prediction result, calculated RGB confidence level, depth confidence level, and selected prediction result.

Although the method of the present invention has been described according to the above sequence, the execution of the method of the present invention should not be limited to the above sequence. Rather, some steps in the method of the present invention may be performed in a different sequence or simultaneously, or in some embodiments, certain steps may not be performed. In addition, any step in the method of the present invention may be performed with a module, unit, circuit, or any other suitable means for performing these steps.

The present invention has good robustness when faced with interference factors such as complex clinical settings based on the dual branch method of the RGB branch and depth branch. For example, the clinical lighting conditions in different hospitals at different locations may be different, which will directly affect the quality of the image acquired by the camera. When the lighting conditions are good, the quality of the RGB image will be higher and the quality of the depth image will be poorer; conversely, when the lighting conditions are poor, the quality of the depth image will be higher and the RGB image will be darker. In this case, either the RGB image or depth image is solely relied on, the lighting conditions will have a decisive impact on whether the prediction model can output an effective prediction result. In contrast, both the RGB branch and depth branch of the present invention generate prediction results; therefore, as long as one of the branches has a prediction result output, then the step of automatically setting a scan range may be performed. When both the RGB branch and the depth branch have output prediction results, a more reliable prediction result from the two predictions may be selected for automatically setting the scan range according to the method of the present invention. Thus, the method of the present invention provides improved reliability and robustness. Additionally, the reliability and robustness of the present invention can be further improved by setting a number of comparative factors. Meanwhile, by implementing automation rather than relying on the operator to manually set the scan range, the method of the present invention has simplified the setting process of the scan range and reduced the errors and deviations incurred in the setting process.

In addition, the method of the present invention has significantly reduced the workload of the operator. After the display outputs the result after performing the method, the operator only needs to verify the result of such output. If the posture of the object to be scanned, the set scan range and the optional current prediction process and result are suitable as indicated by the result of the output, then the operator confirms such result to begin scanning; if not, the method of the present invention is repeated.

The method of the present invention may begin to be performed continuously as soon as the operator creates a new scan task, and can be performed whenever a change of the posture of the object to be scanned is sensed, until the operator confirms the result which is output on the display. Thus, the method of the present invention is performed in real time and capable of responding in a timely manner to posture adjustments of the object to be scanned. The entire scan process is therefore smoother, improving the overall experience of the scanned object.

In practice, after the operator confirms the result of the output on the display, the distance between the key points and the scan center (i.e., the center of the circle of the bore of the gantry of the medical imaging device) may be further calculated through transforming the 3D space coordinates in the camera coordinates into 3D space coordinates in the scan center coordinates system. Taking a human head scan as an example—the distance between the center of the eyebrows of the object to be scanned and the scan center may be calculated. In one embodiment, the object to be scanned enters into the bore of the gantry with the head first. The distance between the key point and the scan center is 1 meter. The scan range is from a spot 0.1 meter floating forward from the scan landmark to a spot 0.2 meter flowing backwards from the scan landmark in the moving direction of the scanning bed. The scan on the site to be scanned may begin when the scanning bed has moved 0.9 meter towards the interior of the bore of the gantry, and the scan may end when the scanning bed has moved 1.2 meters towards the inner side of the bore of the gantry.

Figure 6:
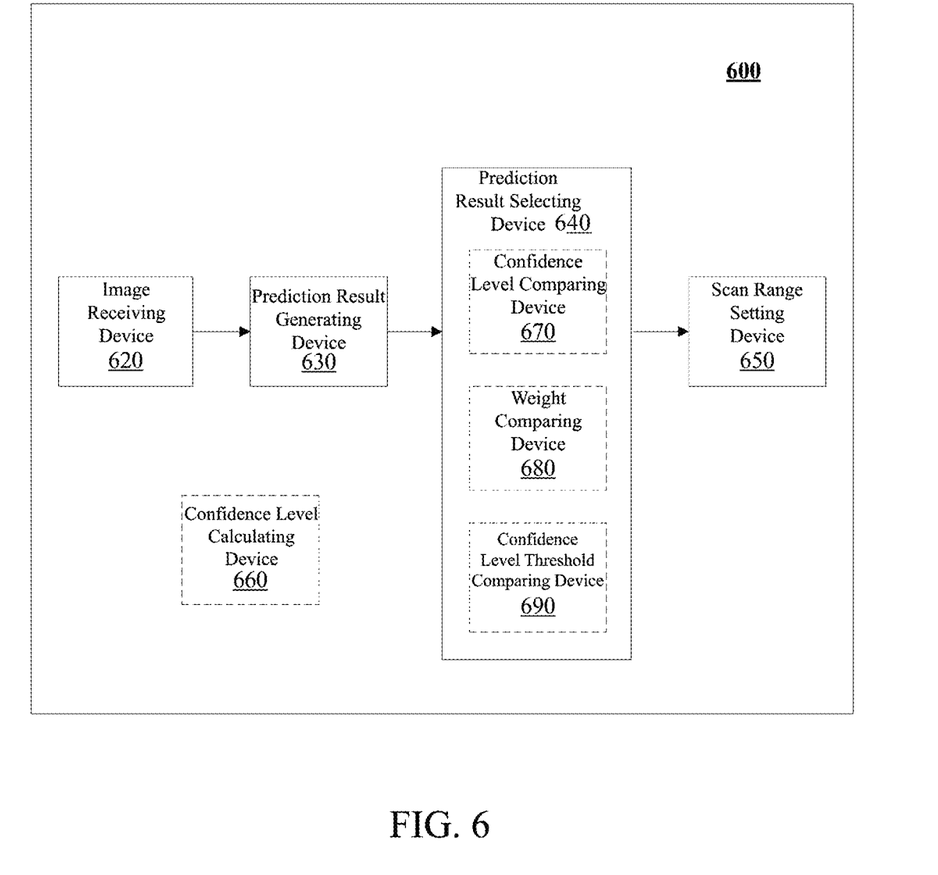
FIG. 6 illustrates a block diagram for an example system for automatically setting a scan range according to an embodiment of the present invention.

Another aspect of the present invention is described below with reference to FIG. 6. FIG. 6 illustrates a block diagram for an example system 600 for automatically setting a scan range according to the embodiment of the present invention. The example system 600 may include an image receiving device 620, a prediction result generating device 630, a prediction result selecting device 640, and a scan range setting device 650.

In the embodiment of the present invention, the image receiving device 620 and the prediction result generating device 630 may be used to implement the RGB branch and depth branch of the present invention. The image receiving device 620 may be used for receiving an RGB image and a depth image of an object to be scanned, respectively, by an RGB image prediction model and a depth image prediction model. The prediction result generating device 630 may be used for generating a RGB prediction result and a depth prediction result with respect to the key points of the object to be scanned, respectively, by an RGB image prediction model and a depth image prediction model. Specifically, the prediction result generating device 630 generates the RGB prediction result through identifying the key points of the object on the RGB image of the object to be scanned using the RGB image prediction model, and generates the depth prediction result through identifying the same key points on the depth image of the object to be scanned using the depth image prediction model.

The system 600 may also include a confidence level calculating device 660 that can be used to respectively calculate the RGB confidence level of the RGB prediction result and the depth confidence level of the depth prediction result.

The prediction result selecting device 640 may be used for selecting a prediction result for setting the scan range from the RGB prediction result and the depth prediction result. In one embodiment, the prediction result selecting device 640 may further comprise a confidence level comparing device 670, a weight comparing device 680, and a confidence level threshold comparing device 690. The confidence level comparing device 670 may be used to compare the RGB confidence level of the RGB prediction result and the depth confidence level of the depth prediction result. The weight comparing device 680 may be used to compare the RGB predetermined weight of the RGB prediction result and the depth predetermined weight of the depth prediction result. The confidence level threshold comparing device 690 may be used to compare the RGB confidence level and the first threshold, and the depth confidence level and the second threshold.

The scan range setting device 650 may be used to automatically set the scan range based on the selected prediction result. In one embodiment, the scan range setting device 650 may implement automatic set of a scan range for the object to be scanned through generating a scan landmark of the object to be scanned by mapping 2D locations of the key points in the selected prediction result into 3D space using a transfer matrix.

In addition, the system 600 may also include a display (not shown in the figure) for displaying to the operator an RGB image of the object to be scanned and a corresponding scan range that is automatically set. Optionally, the display may also display one or more of the depth images of the object to be scanned, the resulting RGB prediction result, depth prediction result, calculated RGB confidence level, depth confidence level, and selected prediction result.

The system 600 corresponds to methods 100, 300, 400, and/or 500 of the present invention; therefore, many details provided for describing methods 100, 300, 400 and 500 herein are also applicable to system 600, which will not be repeated herein.

According to the embodiment of the present invention, a computer readable medium is provided. The computer readable medium has instructions thereon, and when the instructions are executed by a processor, the above noted methods and steps of the present invention are executed by the processor. The computer-readable medium may include, but not limited to, a non-transitory, tangible arrangement of an article manufactured or formed by a machine or apparatus, including a storage medium such as the following: a hard disk; any other type of disk including a floppy disk, an optical disk, a compact disk read-only memory (CD-ROM), a compact disk rewritable (CD-RW), and a magneto-optical disk; a semiconductor device such as a read-only memory (ROM), a random access memory (RAM) such as a dynamic random access memory (DRAM) and a static random access memory (SRAM), an erasable programmable read-only memory (EPROM), a flash memory, and an electrically erasable programmable read-only memory (EEPROM); a phase change memory (PCM); a magnetic or optical card; or any other type of medium suitable for storing electronic instructions. The computer-readable medium may be installed in a CT device, or may be installed in a separate control device or computer that remotely controls the CT device.

According to the embodiment of the present invention, a medical imaging device is further provided, which comprises the system as described FIG. 6.

The technology described in the present invention may be implemented at least in part through hardware, software, firmware, or any combination thereof. For example, aspects of the technology may be implemented through one or more microprocessors, digital signal processors (DSP), application-specific integrated circuits (ASIC), field programmable gate arrays (FPGA), or any other equivalent integrated or separate logic circuits, and any combination of such parts embodied in a programmer (such as a doctor or patient programmer, stimulator, or the other devices). The term "processor", "processing circuit", "controller" or "control module" may generally refer to any of the above noted logic circuits (either alone or in combination with other logic circuits), or any other equivalent circuits (either alone or in combination with other digital or analog circuits).

Some illustrative embodiments of the present invention have been described above. However, it should be understood that various modifications can be made to the exemplary embodiments described above without departing from the spirit and scope of the present invention. For example, an appropriate result can be achieved if the described techniques are performed in a different order and/or if the components of the described system, architecture, device, or circuit are combined in other manners and/or replaced or supplemented with additional components or equivalents thereof; accordingly, the modified other embodiments also fall within the protection scope of the claims.

The invention claimed is:

1. A method for automatically setting a scan range, the method comprising:
   receiving an RGB image and a depth image of an object positioned on a scan table, respectively, by an RGB image prediction model and a depth image prediction model;
   generating an RGB prediction result based on the RGB image and a depth prediction result based on the depth image with respect to predetermined key points of the object, respectively, by the RGB image prediction model and the depth image prediction model;
   selecting a prediction result for setting the scan range from the RGB prediction result and the depth prediction result; and
   automatically setting the scan range based on the selected prediction result.

2. The method according to claim 1, wherein the RGB prediction result and the depth prediction result are independent of one another.

3. The method according to claim 1, wherein each of the RGB image prediction model and the depth image prediction model is a deep-learning model.

4. The method according to claim 1, further comprising:
calculating an RGB confidence of the RGB prediction result and a depth confidence of the depth prediction result, respectively, wherein the step of selecting a prediction result for setting the scan range is based on a comparison of the RGB confidence and the depth confidence.

5. The method according to claim 1, wherein the step of selecting a prediction result for setting the scan range is based on a comparison of an RGB predetermined weight for the RGB prediction result and a depth predetermined weight for the depth prediction result.

6. The method according to claim 4, wherein if the RGB confidence is less than a first threshold and the depth confidence is less than a second threshold, repeating the steps of receiving an RGB image and a depth image respectively, generating an RGB prediction result and a depth prediction result respectively, and calculating an RGB confidence and a depth confidence respectively, until at least one of the RGB confidence and the depth confidence is greater than or equal to a corresponding threshold.

7. The method according to claim 6, wherein if the RGB confidence is greater than or equal to the first threshold or the depth confidence is greater than or equal to the second threshold, selecting the prediction result corresponding to the confidence greater than or equal to a corresponding threshold as the prediction result for setting the scan range.

8. The method according to claim 6, wherein if the RGB confidence is greater than or equal to the first threshold and the depth confidence is greater than or equal to the second threshold, further comparing an RGB predetermined weight for the RGB prediction result and a depth predetermined weight for the depth prediction result, wherein
if the RGB predetermined weight is not equal to the depth predetermined weight, the prediction result having a larger predetermined weight is selected as the prediction result for setting the scan range; and
if the RGB predetermined weight is equal to the depth predetermined weight, the prediction result for setting the scan range is selected based on a result of the comparison of the RGB confidence and the depth confidence.

9. The method according to claim 6, wherein the first threshold and the second threshold are the same.

10. The method according to claim 6, wherein the first threshold and the second threshold are different.

11. The method according to claim 1, wherein the RGB prediction result is generated by identifying the key points on the RGB image using the RGB image prediction model, and the depth prediction result is generated by identifying the key points on the depth image using the depth image prediction model.

12. The method according to claim 1, wherein the key points comprise: head, chest, abdomen, pelvis, left knee joint, right knee joint, left ankle joint, and right ankle joint.

13. The method according to claim 1, wherein the step of automatically setting the scan range based on the selected prediction result comprises:
mapping 2D locations of the key points in the selected prediction result into 3D space using a transfer matrix to generate a scan landmark of the object.

14. The method according to claim 1, wherein displaying the RGB image and the scan range, and optionally displaying the depth image, the RGB prediction result, the depth prediction result, the RGB confidence, the depth confidence, and/or the selected prediction result, to an operator via a display.

15. The method according to claim 1, wherein the method is performed in real time once an operator creates a new scan task, until the operator confirms the scan range, wherein the performed in real time comprises performing the method each time a change in body position of the object is sensed.

16. A system for automatically setting a scan range, comprising:
image receiving means for receiving an RGB image and a depth image of an object positioned on a scan table, respectively, by an RGB image prediction model and a depth image prediction model;
prediction result generating means for generating an RGB prediction result based on the RGB image and a depth prediction result based on the depth image with respect to predetermined key points of the object, respectively, by the RGB image prediction model and the depth image prediction model;
prediction result selecting means for selecting a prediction result for setting the scan range from the RGB prediction result and the dept prediction result; and
scan range setting means for automatically setting the scan range based on the selected prediction result.

17. The system according to claim 16, further comprising:
confidence calculating means for calculating an RGB confidence of the RGB prediction result and a depth confidence of the depth prediction result, respectively, wherein
the prediction result selecting means further comprises:
confidence comparing means for a comparison of the RGB confidence and the depth confidence.

18. The system according to claim 17, wherein the prediction result selecting means further comprises: confidence-threshold comparing means for comparing between the RGB confidence and a first threshold and between the depth confidence and a second threshold, wherein the prediction result selecting means is for:
if the RGB confidence is less than the first threshold and the depth confidence is less than the second threshold, repeatedly causing the image receiving means to receive an RGB image and a depth image respectively, the prediction result generating means to generate an RGB prediction result and a depth prediction result respectively, and the confidence calculating means to calculate an RGB confidence and a depth confidence respectively, until at least one of the RGB confidence and the depth confidence is greater than or equal to a corresponding threshold.

19. The system according to claim 18, wherein the prediction result selecting means is for: if the RGB confidence is greater than or equal to the first threshold or the depth confidence is greater than or equal to the second threshold, selecting the prediction result corresponding to the confidence greater than or equal to a corresponding threshold as the prediction result for setting the scan range.

20. The system according to claim 18, wherein the prediction result selecting means further comprises: weight comparing means for further comparing an RGB predetermined weight for the RGB prediction result and a depth predetermined weight for the depth prediction result, wherein the prediction result selecting means is for:
If the RGB predetermined weight is not equal to the depth predetermined weight, the prediction result having a larger predetermined weight is selected as the prediction result for setting the scan range; and If the RGB predetermined weight is equal to the depth predetermined weight, the prediction result for setting the scan range is selected based on a result of the comparison of the confidence comparing means.

* * * * *